United States Patent [19]

Martino et al.

[11] Patent Number: 4,503,173
[45] Date of Patent: Mar. 5, 1985

[54] SELF-CURING WATER DISPERSED POLYMER BLENDS

[75] Inventors: Phillip C. Martino, Brunswick; Peter P. Winner, North Royalton, both of Ohio

[73] Assignee: SCM Corporation, New York, N.Y.

[21] Appl. No.: 563,126

[22] Filed: Dec. 19, 1983

[51] Int. Cl.³ ............................................. C08L 63/00
[52] U.S. Cl. .................................. 523/407; 523/403; 523/404; 523/411; 523/409
[58] Field of Search ............... 523/403, 404, 406, 407, 523/409, 411

[56] References Cited

U.S. PATENT DOCUMENTS

| | | | |
|---|---|---|---|
| 3,991,216 | 11/1976 | Christenson et al. | 426/216 |
| 4,097,438 | 6/1978 | Christenson et al. | 523/100 |
| 4,164,487 | 8/1979 | Martin | 523/404 |
| 4,169,086 | 9/1979 | Nolken | 526/193 |
| 4,212,781 | 7/1980 | Evans | 523/407 |
| 4,289,812 | 9/1981 | Martin | 427/379 |
| 4,305,859 | 12/1981 | McEwan et al. | 260/29.6 |
| 4,397,970 | 8/1983 | Campbell et al. | 523/403 |

FOREIGN PATENT DOCUMENTS 2034334A 6/1980 United Kingdom .

Primary Examiner—Joseph L. Schofer
Assistant Examiner—J. M. Reddick
Attorney, Agent, or Firm—Thomas M. Schmitz

[57] ABSTRACT

A self-curing water dispersed copolymer particularly useful for coatings for interiors of beverage containers comprises a self-curing water dispersed copolymer of polymerized ethylenic monomers, including alkylol acrylamide monomer and functional monomer, produced by copolymerizing the monomers in the presence of an epoxy phosphate additive.

21 Claims, No Drawings

SELF-CURING WATER DISPERSED POLYMER BLENDS

BACKGROUND OF THE INVENTION

This invention pertains to corrosion resistant water dispersed copolymers and more particularly to emulsion copolymers containing minor amounts of epoxy phosphate. The polymeric blend is particularly useful as paint binders in protective surface coating systems.

Emulsion copolymer systems containing phosphorus additives are suggested in U.S. Pat. No. 4,169,086 where the use of organic phosphates and phosphonates are used as buffers in the copolymerization process. Water based coating compositions for use as an interior can liner are suggested in U.S. Pat. No. 3,991,216 wherein the polymer comprises an interpolymer of copolymerized acrylamide monomer, carboxylic monomer, and other ethylenically unsaturated monomers. Commonly assigned copending application Ser. No. 468,364 filed Feb. 22, 1983 discloses a self-curing water dispersed emulsion copolymer blended with an epoxy-acrylic copolymer and a phosphated epoxy copolymer.

It now has been found that a self-curing emulsion copolymer produced by copolymerizing a certain combination of monomers in the presence of a minor amount of water dispersed high molecular weight epoxy phosphate additive used as an emulsifier provides a copolymer particularly useful in binder systems for corrosion resistant protective coatings. The phosphate esters of relatively high molecular weight provide functional groups in conjunction with the self-curing emulsion copolymer which can be further cross-linked with an external cross-linker such as melamine to provide excellent film barrier properties along with other film integrity properties. The self-curing emulsion copolymer comprises copolymerized ethylenic monomers including alkylol acrylamide monomers and carboxyl, hydroxyl, amine, or amide functional monomers. In accordance with this invention, the emulsified or water dispersed epoxy phosphate is used as the primary surfactant for the preparation of the emulsion copolymers. The self-curing water dispersed copolymer can be prepared in water in the presence of a high molecular weight epoxy phosphate to provide a self-curing water dispersed copolymer in combination with a phosphated polymer. The epoxy phosphate esters are prepared by reacting phosphoric acid with relatively high molecular weight adducts of bisphenol A reacted with low molecular weight epoxy resins such as DER 333. The high molecular weight epoxy can be reacted with between about 0.05% and 5% by weight of phosphoric acid by methods suggested in U.S. Pat. No. 4,289,812 and U.S. Pat. No. 4,316,922. These epoxy phosphates are believed to be coreactive with functional groups on the self-curing water codispersed polymer and crosslink with aminoplast crosslinker to form thermoset films with good barrier properties. During the polymerization process, the epoxy phosphate acts as primary surfactant to control the particle size of the self-curing copolymer. The epoxy phosphate also advantageously stabilizes these polymer particles as their diameter increases. During cure, it is believed the epoxy phosphate acts as an acid crosslinking catalyst by promoting reaction between aminoplast external crosslinker and the self-curing copolymeric hydroxyl groups. (The epoxy phosphate may also participate in crosslink formation reactions through reaction of hydroxyl group adjacent to the phosphate.) Utilizing the epoxy phosphate for emulsion copolymerization inparts excellent corrosion resistance to resultant self-curing emulsion copolymers. The copolymer is particularly useful when applied as protective coating for interior surfaces of food and beverage cans by exhibiting excellent resistance to the corrosive effects of soft drinks and certain foods. These and other advantages will become more apparent by referring to the detailed description of the invention and the accompanying illustrative examples.

SUMMARY OF THE INVENTION

Briefly, a self-curing water dispersed copolymer is produced by polymerizing on a weight basis between 1% and 20% alkylol acrylamide monomer, between 1% and 20% reactive functional monomer selected from carboxyl, hydroxyl, amine, or amide functional monomer, along with other ethylenic monomers in water in the presence of about 0.1% to 20% epoxy phosphate additive based on the weight of monomers. Preferably the alkylol acrylamide monomer is reacted in the second step of a two-step process to preferentially locate alkylol acrylamide on the surface of emulsion copolymerized particles. Most preferably, the alkylol acrylamide monomer is reacted at temperatures above 70° C. to allow coreaction with some of the functional monomer present. The composition of this invention comprises by weight an in-situ formed mixture of self-curing water dispersed polymer containing between 0.10% and 20% epoxy phosphate. An aminoplast or similar external crosslinking resin can be added to provide improved curing properties.

DETAILED DESCRIPTION OF THE INVENTION

In accordance with this invention, the water dispersed copolymer composition comprises certain reactive self-curing water dispersed copolymers in combination with an epoxy phosphate copolymer and produced by in-situ copolymerization of ethylenic monomers in the presence of the epoxy phosphate.

Referring first to the reactive self-curing water dispersed copolymer, the reactive self-curing copolymer preferably is an emulsion copolymer containing copolymerized ethylenically unsaturated monomers comprising (i) alkylol acrylamide and preferably alkylated alkylol acrylamide monomers, (ii) functional monomers consisting of reactive carboxy, hydroxyl, amine, or amide monomers, and (iii) other ethylenically unsaturated monomers to produce self-reactive alkylol acrylamide water dispersed copolymer. The self-curing water dispersed copolymer preferably is synthesized by step-wise copolymerization of monomers in water by first copolymerizing a portion of the ethylenic monomers, and then copolymerizing the remaining monomers including the alkylol acrylamide monomers in the second polymerization step. Thus, the polymer particles contain polymerized alkylol acrylamide preferentially orientated on the surface of the polymer particles, whereby the water dispersed polymers are self-curing. The two stage monomers are preferably proportioned on a weight basis from 25/75 to 75/25 first stage/second stage monomers. The second stage should also contain monomers already included in the first stage, plus 3–15% alkylol acrylamide derivative based on total monomer in both stages. Preferably, monomer composition of the two stages are similar, particularly with respect to the carboxyl monomer level and the polymer Tg, which will insure compatability between the two monomer stages and preclude unnecessary agglomeration during the polymerization process.

The alkylated alkylol acrylamide monomers can be derivatives of acrylamide methacrylamide, methylol acrylamide, or similar alkyl modified acrylamide monomer as shown for example in U.S. Pat. No. 3,991,216; U.S. Pat. No. 4,097,438; and U.S. Pat. No. 4,305,859. The acrylamide monomers preferably are alkylated with an alkyl group such as methyl, ethyl, propyl, n-butyl, or iso-butyl, and similar alkylated alkylol acrylamide monomers, wherein the butylated monomers are preferred. Functional monomers include carboxyl, hydroxyl, amino, and amido functional group containing monomers. Carboxy containing monomers include acrylic acid and low alkyl substituted acrylic acids wherein the preferred carboxylic monomers are acrylic and methacrylic acids. Hydroxyl containing monomers are hydroxy containing ethylenically unsaturated monomers including hydroxy alkyl acrylates such as 2-hydroxy ethyl acrylate and methacrylate, 2-hydroxypropyl acrylate and methacrylate, and similar hydroxy alkyl acrylates. Amido containing monomers include acrylamide and methacrylamide or similar alkylol acrylamide monomers. Reactive monomers further include N-methylol acrylamide or methacrylamide monomers.

The remaining ethylenically unsaturated monomers can be copolymerized with the alkylol acrylamide monomer and functional monomers to form a reactive water dispersed copolymer comprising ethylenic monomers including vinyl, vinylidene, acrylic, allylic and unsaturated mono or dicarboxylic acids. Vinyl monomers include, for example, vinyl esters such as vinyl acetate, vinyl proprionate, vinyl butyrates, vinyl benzoate, isopropenyl acetate and similar vinyl esters; and vinyl halides such as vinyl chloride. Vinyl aromatic hydrocarbon monomers can include, for example, styrene, methyl styrenes and similar alkyl styrenes, chlorostyrene, vinyl toluene, vinyl naphthalene, divinyl benezene, diallyl phthalate and similar diallyl derivatives. Vinyl aliphatic monomers include olefinic unsaturated monomers such as 2-butadiene, substituted butadienes, cyclopentadienes, dicyclopentadiene, cyclohexane, and vinyl naphthalene. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates.

The reactive self-curing water dispersed copolymer preferably is prepared by copolymerizing the ethylenically unsaturated monomers in water by the two step polymerization technique described above through free radical induced polymerization using peroxy or azo catalyst, common redox catalyst, ultraviolet radiation or the like. Free radical initiators for example include various peroxygen compounds such as persulfates, benzoyl peroxide, t-butyl hydroperoxide, cumene hydroperoxide, and similar peroxide catalysts. Azo compounds include for example azo bis-isobutyronitrile and dimethylazobis-isobutyrate. Initiating systems further include alkali metal persulfate or ammonium persulfate with or without a reducing substance adapted to activate the persulfate. The initiators or catalysts ordinarily are used at a level of about 0.1% to 1% by weight of monomers. Preferably, the alkylol acrylamide monomer is copolymerized at temperatures above 70° C. to allow some coreaction with functional groups on the functional monomers.

The resulting self-curing water dispersed copolymer contains by weight between 1% and 20% copolymerized alkylol acrylamide monomer, between 1 and 20% reactive carboxyl, hydroxyl, amine or amide monomer, the remainder comprising other ethylenically unsaturated monomers.

Referring now to epoxy phosphate additive, the preferred copolymer comprises epoxy resin coreacted with phosphoric acid to produce epoxy phosphate copolymer. The epoxy phosphate copolymer contains on an equivalent basis at least about 0.1 equivalent of phosphate per equivalent of epoxide and preferably between about 0.1 to 1 equivalent of phosphate per epoxide equivalent on the epoxy polymer. Thus, a mole of monoepoxide polymer can contain up to about 1 mole of phosphate whereas a mole of a diepoxide polymer can contain up to 2 moles of phosphate. On a weight basis based on reactants, the epoxy phosphate copolymer contains between about 0.05% and 5%, and preferably between 0.1% and 3% coreacted phosphoric acid, although excess molar amounts of phosphate reactant in any appreciable amounts are undesirable. The epoxy copolymer used in preparing the epoxy phosphate can be epoxy polymers having a molecular weight greater than 200 and up to about 10,000 and preferably between about 400 and 8,000. The epoxy copolymer can be a conventional copolymer produced by the condensation reaction of epichlorohydrin or dichlorohydrin with bisphenols or polyhydric phenols, polyalcohols, polyfunctional halohydrins, and certain polyepoxides. Monoepoxides such as phenyl glycidyl ether are suitable although diepoxides are preferred. The preferred epoxy copolymers are produced by coreacting epichlorohydrin or dichlorohydrin with bisphenol-A to provide linear epoxy copolymers having pendant epoxide groups. The most preferred epoxy copolymers are prepared by reaction of epichlorohydrin with bisphenol-A. The epoxy polymer can contain between 2 and 25 monomer units and preferably between 3 and 20 copolymerized monomer units (bisphenol-A) wherein the epoxy polymer can be either a mono or diepoxide polymer. The epoxy phosphate copolymer can be synthesized by heating a solution of epoxy resin dispersed in a suitable solvent such as methyl ethyl ketone or 2-butoxy ethanol and then reacted with phosphoric acid or preferably polyphosphoric acid at reflux temperatures of 120° C. to 145° C. for sufficient time, typically 2 to 5 hours, to completely react the phosphoric acid with available epoxide groups. The preparation of epoxy phosphate resins are shown in U.S. Pat. No. 4,289,812 and U.S. Pat. No. 4,316,922. The epoxy phosphate can be prepared from a single epoxy resin or from a mixture of epoxy resins. In a further variation of this aspect of the invention, the epoxy phosphate polymer can be produced by reacting a non-phosphated epoxy resin with an epoxy resin containing higher levels of phosphate, provided that the resulting epoxy resin mixture contains between about 0.05% and 5% by weight coreacted phosphoric acid. For instance, a weight ratio of 9 parts non-phosphated epoxy resin mixed with 1 part phosphated (10%) epoxy resin coreacted together at temperatures above 120° C. for at least 2 hours provides an epoxy phosphate copolymer containing 1% coreacted phosphoric acid in accordance with this invention. In practice, the non-phosphated epoxy resin is reacted with phosphated (10%) epoxy resin at sufficiently high temperatures for time sufficient to convert the mixture to predominately a monophosphate, which can be enhanced by the addition of 2% water based on solids to hydrolyze the phosphated mixture and preferably convert the mixture to a predominately monophosphated epoxy resin. Other phosphated epoxy copolymers useful as epoxy phosphate surfactants are aqueous dispersed epoxy-acrylic copolymers. Examples of useful epoxy-acrylic copolyers are gaft copolymers produced by in-situ polymerization of acrylic and other monomers in the presence of epoxy resin, or gaft copolymers produced by reacting a preformed carboxylic acrylic copolymer with epoxy resin in the presence of at least about 2% by weight of amine based on the weight of reactants. The epoxy phosphate copolymer containing between 0.05% and 5% coreacted phosphoric acid in accordance with this invention then can be dispersed into an amine and water mixture by mechanical mixing. The resulting aqueous dispersed epoxy phosphate can be added to the aqueous polymerization medium to function as a surfactant during subsequent in-situ polymerization of the ethylenic monomers in the presence of the epoxy surfactant.

The water dispersed copolymers are most commonly prepared by emulsion copolymerization in the presence of the eopxy phosphate emulsifier, although other aqueous polymerization processes can be used. In the most preferred method, monomers are emulsion copolymerized during 6-8 hours at temperatures above 70° C. and preferentially between 70°–80° C. utilizing standard semi-continuous methodology. Monomer conversion is routinely above 99.8% and the final non-volatile content is usually 45–55%. The preferred particle size range is between 2000–4000 Å for optimum application characterisitics, although this range can be expanded since particle size has been found to have little effect upon coatings performance. Polymer Tg is also important for application characteristics, and should be between about 0° C. and 70° C.

A highly desirable coating composition can be prepared in accordance with this invention by emulsion copolymerizing various ethylenic monomers in the presence of epoxy phosphate to result in a self-curing water dispersed copolymer containing epoxy-phosphate. The desirable polymeric composition comprises on a weight basis between 0.10% and 20% epoxy phosphate. The foregoing binder matrix copolymer compositions are then mixed with a water-dispersible cross-linking component generally referred to as aminoplast resin. This aminoplast resin will crosslink with carboxyl and hydroxyl functionalities of the epoxy-acrylic copolymer mixture during cure. On a polymer weight basis, the coating composition binder contains between 0% and 15% but preferably between 1% and 10% aminoplast crosslinking resin mixed with between 85% and 100% of the above indicated matrix polymer compositions.

Referring next to the aminoplast cross-linking resins, aminoplasts are melamine or melamine derivatives such as methylol melamine or similar alkylated melamine formaldehyde resins. Aminoplasts further include benzoguanamine, acetoguanamine, as well as ureaformaldehyde. Commercially available aminoplasts which are water-soluble or water-dispersible for the instant purpose include Cymel 301, Cymel 303, Cymel 370, and Cymel 373 (all being products of American Cyanamid, Stamford, Conn., said aminoplasts being melamine based, e.g., hexamethoxy-methyl melamine for Cymel 301), and Beetle 80 (products of American Cyanamid which are methylated or butylated ureas). Other suitable aminoplast resins are of the type produced by the reaction of aldehyde and formal guanamine; ammeline; 2-chloro-4,6-diamine-1,3,5-triazine; 2-phenyl-p-oxy-4,6-diamino-1,3,5-triazine; and 2,4,6-triethyl-triamino-1,3,5-triazine. The mono, di-, or tri-aryl melamines, such as 2,4,6-triphenyl-triamino-1,3,5-triazine, are preferred.

The water-dispersed coating compositions can be produced by mixing together the various water-dispersed copolymers. The self-curing water dispersed copolymer is prepared in aqueous medium in the presence of epoxy phosphate. The aminoplast polymer can be dispersed into water by mechanical mixing. The amount of water contained in the coating composition containing the epoxy-acrylic copolymer, the reactive self-curing polymer, the phosphated polymer, and the aminoplast resin depends on the viscosity desired, which in turn, relates to the method of application for spraying, preferably the coating composition contains between about 10% and 30% by weight polymeric solids relative to 70% to 90% water including other volatiles such as minor amounts of solvent. For applications other than spraying, the aqueous polymeric dispersions can contain between about 10% and 40% by weight water. Organic solvents can be utilized to facilitate spray or other application methods and such solvents include n-butanol, 2-butoxy-ethanol-1, xylene, toluene, and preferably n-butanol is used in combination with 2-butoxy-ethanol-1. The coating composition of the present invention can be pigmented and/or opacified with known pigments and opacifiers. For many uses, including food uses, the preferred pigment is titanium dioxide. The resulting aqueous coating composition can be applied satisfactorily by conventional methods known in the coating industry. Thus, spraying, rolling, dipping, and flow coating application methods can be used for both clear and pigmented films, although spraying is preferred. After application onto the metal substrate, the coating is cured thermally at temperatures in the range from about 95° C. to about 235° C. or higher for time sufficient to effect complete curing as well as volatilizing of any fugitive component therein. Upon heat curing, the self-curing copolymer is believed to become reactive and self-curing wherein the alkyl chain of the alkoxy acrylamide splits from the alkylol acrylamide chain whereby the acrylamide chain of the polymer reacts with the functional monomer groups of carboxyl, hydroxyl, or amido groups, or can react with the hydroxyl functionality in the epoxy phosphate ester as well as the aminoplast resin.

For metal sheet substrates intended as beverage containers and particularly for carbonated beverages such as beer, the coating should be applied at a rate in the range of 0.5 to 15 milligrams of polymer coating per square inch of exposed metal surface. To attain the foregoing, the water-dispersible coating as applied can be as thick as 0.1 to 1 mil.

For a better understanding of the present invention, the following examples are provided. In this application, all parts are parts by weight, all percentages are weight percentages, and temperatures are degrees Centigrade unless otherwise expressly noted.

EXAMPLE 1

Epoxy Phosphate Synthesis

Procedure A

The epoxy phosphate was prepared according to the following procedure: 1005 gms. of epoxy resin (DER-333) and 340.5 gms. of bisphenol-A and 178 gms. of butyl cellosolve were heated to 140° C. in a 5 L round bottom flask equipped with stirrer, condenser and thermometer. When the temperature was at 140° C., the heat was turned off and the exotherm raised the temperature to 188° C. After the exotherm was peak, the batch was kept at 175° C. for an additional 5 hours. Periodic testing for viscosity and percent oxirane was made. Target oxirane value was about 2.28% and viscosity at 40% non-volatile between I-J. When these values were obtained, 227 gms. of butyl cellosolve were added, and the batch was cooled to 120° C. When the batch temperature was at 120° C., a mixture of 63.64 gms. of 85% phosphoric acid and 20 gms. of butyl cellosolve was added dropwise. The exotherm raised the batch temperature to 145° C. The batch was cooled to 120° C. and held for a half hour. Twenty-seven gms. of water were added to the reaction mixture and the batch was held at 120° C. for an additional 4 hours. After the hold, 241 gms. of butanol, 78 gms. of butyl cellosolve, 122.5 gms. of dimethylethanolamine and 2,500 gms. of deionized water were added respectively. The final mixture was agitated for 2 hours to obtain a stable emulsion.

Procedure B

Epoxy phosphate was produced by adding 816 gms. of epoxy resin (DER-333), 384 gms. of bisphenol-A, and 163 gms. of butyl cellosolve in a 5 L round bottom flask equipped with a stirrer, condenser, and thermometer and heated to 140° C. When the temperature was at 140° C., the heat was turned off and the exotherm raised the temperature to 155° C. After the exotherm was peak, the heat was turned back on to keep the temperature at 175° C. for an additional 2 hours. Periodic testing for viscosity and percent oxirane were made. Oxirane value was about 0.87% and the viscosity was X-Y at 40% NV in butyl cellosolve. When these values were obtained, 163 grams of butyl cellosolve were added, and the batch was cooled to 125° C. Mixture of 14.2 gms. of polyphosphoric acid (FMC) and 50 gms. of butyl cellosolve was added over 45 minutes, 30 gms. of extra butyl cellosolve was added as line rinse. The batch was held at 120° C. for 1 hour. Then 23 gms. of DI water were added to the reaction mixture and the held batch was at 120° C. for an additional 2 hours. After the hold time, the heat was turned off and 203 gms. of butanol were added over 8 minutes. 1550 gms. of DI water and 17.4 gms. of dimethyl ethanolamine were heated in a letdown container to 60° C. The above resin was dropped slowly into water amine mixture to form a stable emulsion. The resulting emulsion was adjusted to 25% NV by adding 1000 grams of DI water and stirring continued for 2 hours to insure an homogeneous mixture.

In accordance with the Procedure A or B, various epoxy phosphates were produced with the following molecular weight variation.

TABLE 1

| Molecular Weight | % Oxirane | % Acid | % NV | Emulsion |
|---|---|---|---|---|
| 9410 | 0.34 | 0.35 | 30.3 | Good |
| 6150 | 0.52 | 0.39 | 34.4 | Good |
| 4000 | 0.80 | 0.92 | 34.9 | Good |
| 3080 | 1.04 | 0.92 | 32.8 | Good |
| 2500 | 1.26 | 2.30 | 23.0 | Good |
| 1400 | 2.28 | 4.20 | 22.4 | Good |

EXAMPLE 2

Emulsion Copolymer

Loaded 115 parts of deionized water and 11.0 parts epoxy phosphate from Example 1 into a three necked round bottomed flask, and heated under nitrogen sparge with agitation to 77°∓1° C. At equilibriated reaction temperature, turned off sparge and added a mixture of 1.20 parts styrene and 0.80 parts ethyl acrylate to the flask and allowed to emulsify 10 minutes.

The monomer feed consisted of 45.0 parts styrene, 38.0 parts ethyl acrylate, 5.0 parts methacrylic acid, 10.0 parts NiBMA, and 0.10 parts sodium bis(tridecyl)sulfosuccinate.

The monomer mix was added at a constant rate to the polymerization so that addition was completed in 4–4.5 hours. Temperature was maintained at 77°∓1° C. during the addition. Agitation was maintained at a rate sufficient to emulsify the reaction mixture. After monomer feed was completed, the batch was held for two hours while maintaining reaction temperature and agitation before cool down and filtration.

EXAMPLES 3-11

In a manner similar to Example 2, various latexes were produced including the various levels of monomers indicated. The parts shown are by weight and the total monomer feed basis is 100 parts. The remaining monomers were other ethylenic monomers such as styrene and minor amounts of ethyl acrylate. The epoxy phosphate was from Example 1, Procedure A and was added as 3 weight parts of solids dispersed in water.

TABLE 2

| | EXAMPLES 3-11 | | | | | | | | |
|---|---|---|---|---|---|---|---|---|---|
| | Ex. 3 | Ex. 4 | Ex. 5 | Ex. 6 | Ex. 7 | Ex. 8 | Ex. 9 | Ex. 10 | Ex. 11 |
| Alkylol Acrylamide | NMA[1] | NMA | NMA | NiBMA[2] | NiBMA | NiBMA | NiBMA | NiBMA | NiBMA |
| Alkylol Acrylamide Level | 1.0 | 1.0 | 2.0 | 5.0 | 5.0 | 10.0 | 10.0 | 10.0 | 15.0 |
| Carboxyl Monomer Level | 5.0 | 5.0 | 5.0 | 5.0 | 5.0 | 5.0 | 10.0 | 5.0 | 5.0 |
| Addition Functional Monomer | none | HEA[3] | AM[4] | none | HEA | none | none | HEA | none |
| Additional Functional Monomer Level | | 3.0 | 1.0 | | 3.0 | | | 5.0 | |

TABLE 2-continued

| | EXAMPLES 3-11 | | | | | | | | |
|---|---|---|---|---|---|---|---|---|---|
| | Ex. 3 | Ex. 4 | Ex. 5 | Ex. 6 | Ex. 7 | Ex. 8 | Ex. 9 | Ex. 10 | Ex. 11 |
| Copolymer Tg | 20° | 20° | 30° | 40° | 20° | 40° | 50° | 20° | 30° |

[1]NMA = N—Methylol Acrylamide
[2]NiBMA = N—Isobutoxy Methylacrylamide
[3]HEA = Hydroxy Ethyl Acrylate
[4]AM = Acrylamide

We claim:

1. A water dispersed coating composition comprising:
   a self-curing water dispersed copolymer produced by in-situ copolymerization of monomers in water in the presence of an epoxy phosphate, said copolymer comprising polymerized ethylenically unsaturated monomers including between 1% and 20% alkylol acrylamide monomer, between 1% and 20% reactive functional monomer selected from carboxyl, hydroxyl, amine or amide functional monomer, and the balance of monomer being other ethylenic monomers, said ethylenically unsaturated monomers copolymerized in water in the presence of 0.1% to 20% epoxy phosphate additive based on the weight of monomers copolymerized.

2. The composition in claim 1 wherein the alkylol acrylamide monomer is an alkylated alkylol acrylamide monomer.

3. The composition in claim 2 wherein the alkylated alkylol acrylamide monomer is butylated acrylamide monomer.

4. The composition in claim 1 wherein the ethylenically unsaturated monomers are copolymerized at temperatures above 70° C.

5. The composition in claim 1 wherein the monomers are copolymerized in two steps and the alkylol acrylamide monomer is copolymerized in the second step.

6. The composition in claim 5 wherein the two step monomer addition is proportioned on a weight basis between 25/75 and 75/25 for first/second stage monomer addition.

7. The composition in claim 1 wherein the epoxy phosphate additive comprises epoxy resin containing between 0.1 to 1 equivalent of phosphate per epoxide equivalent on the epoxy resin.

8. The composition in claim 1 wherein the epoxy phosphate additive comprises epoxy resin coreacted with 0.05% to 5% by weight phosphoric acid based on reactants.

9. The composition in claim 1 wherein the epoxy phosphate additive is derived from an epoxy resin having a molecular weight between 200 and 10,000.

10. The composition in claim 1 wherein the epoxy phosphate additive comprises a phosphated epoxy-acrylic copolymer.

11. The composition in claim 10 wherein the epoxy-acrylic copolymer comprises a graft copolymer.

12. The composition in claim 1 wherein the epoxy-acrylic copolymer comprises an epoxy-acrylic ester copolymer.

13. The composition in claim 1 containing between 1% and 10% aminoplast resin.

14. A process for producing a water dispersed copolymer for use in a coating composition, the process comprising:
    copolymerizing ethylenically unsaturated monomers, including between 1% and 20% by weight alkylol acrylamide monomer and between 1% and 20% by weight reactive functional monomer, the balance being other ethylenic monomers, the copolymerization being in an aqueous medium in the presence of 0.1 to 20% epoxy phosphate additive to produce a stable water dispersed self-curing polymer.

15. The process in claim 14 wherein the alkylol acrylamide monomer is an alkylated alkylol acrylamide monomer.

16. The process in claim 15 wherein the alkylol acrylamide monomer is a butylated alkylol acrylamide.

17. The process in claim 14 wherein the ethylenically unsaturated monomers are copolymerized at temperatures above 70° C.

18. The process in claim 14 wherein the process is a two-stage polymerization process and the alkylol acrylamide monomer is copolymerized in the second step.

19. The process in claim 18 wherein the two-stage process comprises proportioning the first-stage and second-stage monomers on a weight basis between 25/75 and 75/25 of first/second stage monomer additions.

20. The process in claim 14 wherein the epoxy phosphate was produced by reacting 0.05% to 5% phosphoric acid with epoxy resin based on weight of reactants.

21. The process in claim 20 wherein the epoxy phosphate is a surfactant.

* * * * *